United States Patent
Vasseur (10) Patent No.: US 7,900,667 B2
(45) Date of Patent: *Mar. 8, 2011

(54) TREAD FOR A TIRE

(75) Inventor: Didier Vasseur, Clermont-Ferrand (FR)

(73) Assignee: Michelin Recherche et Technique S.A. (CH)

( * ) Notice: Subject to any disclaimer, the term of this patent is extended or adjusted under 35 U.S.C. 154(b) by 621 days.

This patent is subject to a terminal disclaimer.

(21) Appl. No.: 11/650,146

(22) Filed: Jan. 5, 2007

(65) Prior Publication Data

US 2007/0112120 A1 May 17, 2007

Related U.S. Application Data (63) Continuation of application No. 10/353,145, filed on Jan. 28, 2003, now Pat. No. 7,199,175, which is a continuation of application No. PCT/EP01/08566, filed on Jul. 25, 2001.

(30) Foreign Application Priority Data

Jul. 31, 2000 (FR) ...................... 00 10094

(51) Int. Cl.
*B60C 1/00* (2006.01)
*C08K 3/36* (2006.01)

(52) U.S. Cl. ................ 152/209.1; 152/905; 524/492; 524/495; 524/571; 525/132

(58) Field of Classification Search .......... 524/492, 524/495, 571; 152/209.1, 905; 525/132
See application file for complete search history.

(56) References Cited

U.S. PATENT DOCUMENTS

| | | | |
|---|---|---|---|
| 3,638,702 A * | 2/1972 | Endter ............... | 152/209.1 |
| 4,699,832 A | 10/1987 | Sattelmeyer | |
| 5,227,425 A | 7/1993 | Rauline | |
| 5,616,655 A | 4/1997 | D'Sidocky | |
| 5,641,820 A | 6/1997 | Wideman et al. | |
| 5,723,531 A * | 3/1998 | Visel et al. ............ | 524/496 |
| 5,728,778 A | 3/1998 | D'Sidocky et al. | |
| 5,739,211 A | 4/1998 | Wideman et al. | |
| 5,840,113 A | 11/1998 | Freeman et al. | |
| 5,852,099 A | 12/1998 | Vanel | |
| 5,859,115 A | 1/1999 | Rennar | |
| 5,871,597 A | 2/1999 | Vasseur | |
| 5,886,074 A | 3/1999 | Sandstrom et al. | |
| 5,900,449 A | 5/1999 | Custodero et al. | |
| 5,900,467 A | 5/1999 | Wideman et al. | |
| 6,040,389 A | 3/2000 | Wideman et al. | |
| 6,191,205 B1 | 2/2001 | Micouin et al. | |
| 6,313,205 B1 | 11/2001 | Chiron et al. | |
| 6,344,506 B2 | 2/2002 | Vasseur | |
| 6,391,945 B2 | 5/2002 | Sandstrom | |
| 6,420,488 B1 | 7/2002 | Penot | |
| 6,536,492 B2 | 3/2003 | Vasseur | |
| 6,765,045 B1 | 7/2004 | Daniel et al. | |
| 6,975,396 B2 | 12/2005 | Custodero et al. | |
| 7,199,175 B2 * | 4/2007 | Vasseur ............... | 524/492 |
| 2003/0212185 A1 * | 11/2003 | Vasseur ............... | 524/492 |
| 2005/0043448 A1 | 2/2005 | Vasseur | |
| 2005/0049344 A1 | 3/2005 | Vasseur | |

FOREIGN PATENT DOCUMENTS

| | | |
|---|---|---|
| EP | 0831123 | 3/1998 |
| EP | A-0881252 | 12/1998 |
| EP | 1074582 | 2/2001 |
| JP | 09155884 A * | 6/1997 |
| WO | WO 99/02590 | 1/1999 |
| WO | WO 99/02601 | 1/1999 |
| WO | WO 99/02602 | 1/1999 |
| WO | WO 99/28376 | 6/1999 |
| WO | WO 00/05300 | 2/2000 |
| WO | WO 00/05301 | 2/2000 |

OTHER PUBLICATIONS

Machine translation of JP 09-155884 A, Jun. 17, 1997.*

* cited by examiner

*Primary Examiner* — Vickey Nerangis
(74) *Attorney, Agent, or Firm* — Frank J. Campigotto; E. Martin Remick; Kurt J. Fugman (57) ABSTRACT

A tire tread and a tire comprising a tire tread, the tire tread having a rubber composition based on a diene elastomer; more than 50 phr of an inorganic filler as reinforcing filler; between 2 and 15 phr of an inorganic filler/diene elastomer coupling agent; between 1 and 10 phr of a methylene acceptor, and between 0.5 and 5 phr of a methylene donor. The tread may be characterized as having a radially increasing rigidity gradient from the surface towards the inside of the tread after mechanical run-in of the tread. In particular embodiments, the tread may be characterized as having a nominal secant modulus at 10% elongation is between 3 and 7 MPa at a radially outer surface of the tread and between 9 and 13 MPa at the most radially inside of the tread.

20 Claims, 1 Drawing Sheet

FIG. 1

TREAD FOR A TIRE

The present application is a continuation of U.S. patent application Ser. No. 10/353,145, filed 28 Jan. 2003 now U.S. Pat. No. 7,199,175 and fully incorporated herein by reference, which was a continuation of International Application No. PCT/EPO1/08566, filed 25 Jul. 2001, published in French with an English Abstract on 7 Feb. 2001, under PCT Article 21(2), which claims priority to French Patent Application No. FR00/10094, filed 31 Jul. 2000.

BACKGROUND OF THE INVENTION

1. Field of the Invention

The present invention relates to elastomers and more particularly, to elastomers and treads for tires made from elastomers.

2. Description of the Related Art

Since fuel economies and the need to protect the environment have become priorities, it has proved necessary to produce tires having reduced rolling resistance. This has been made possible in particular due to the discovery of new rubber compositions reinforced with specific inorganic fillers referred to as "reinforcing" fillers, which are capable of rivaling conventional carbon black from the reinforcing point of view, and furthermore offering these compositions a low hysteresis, which is synonymous with lesser rolling resistance for the tires comprising them.

Such rubber compositions, comprising reinforcing inorganic fillers of the siliceous or aluminous type, have for example been described in patents or patent applications EP-A-0 501 227 (or U.S. Pat. No. 5,227,425), EP-A-0 735 088 (or U.S. Pat. No. 5,852,099), EP-A-0 810 258 (or U.S. Pat. No. 5,900,449), EP-A-0 881 252, WO99/02590, WO99/02601, WO99/02602, WO99/28376, WO00/05300 and WO00/05301.

Mention will be made in particular of documents EP-A-0 501 227, EP-A-0 735 088 or EP-A-0 881 252, which disclose diene rubber compositions reinforced with precipitated silicas of the highly dispersible type, such compositions making it possible to manufacture treads having a significantly improved rolling resistance, without adversely affecting the other properties, in particular those of grip, endurance and wear resistance. Such compositions having such an excellent compromise of contradictory properties are also described in applications EP-A-0 810 258 and WO99/28376, with specific aluminous fillers (alumina or aluminium oxide-hydroxides) of high dispersibility as reinforcing inorganic fillers.

Ideally, a tire tread must meet a large number of technical demands, which are frequently contradictory, including: high wear resistance, low rolling resistance, very good grip both on dry ground and on wet, snow-covered or icy ground, while offering the tire a very good level of road behaviour ("handling") on an automobile, in particular high drift thrust ("cornering").

To improve the road behaviour, it is known that greater rigidity of the tread is desirable, this stiffening of the tread possibly being obtained for example by increasing the amount of reinforcing filler or by incorporating certain reinforcing resins into the rubber compositions constituting these treads.

However, such stiffening of the tread, at the very least for its surface part which is in contact with the ground during running of the tire, in known manner impairs, most frequently in crippling manner, the properties of grip on wet, snow-covered or icy ground.

To meet these two contradictory demands, namely road behaviour and grip, it has essentially been proposed hitherto to use composite treads (i.e. hybrid treads), formed by two radially superposed layers ("cap-base structure") of different rigidity, formed of two rubber compositions of different formulations: the radially outer layer, in contact with the road, is formed of the most flexible composition, in order to meet the grip requirements; the radially inner layer is formed of the most rigid composition, in order to meet the road-behaviour requirements.

Such a solution however has numerous disadvantages that include, for example, the manufacturing of a composite tread is by definition more complex and therefore more costly than that of a conventional tread, and requires in particular the use of complex coextrusion machines; during manufacturing, after cutting out the tread to the correct dimensions once it has emerged from the extruder, it is furthermore necessary to manage discarding of material of different natures, which further substantially increases the production costs; and once the radially outer (flexible) part of the tread has become worn, it is the initially inner part of the tread which comes into contact with the road: then, of course, one has the disadvantages of an excessively rigid tread, with unsatisfactory performance from the point of view of the technical compromise initially intended.

SUMMARY OF THE INVENTION

Particular embodiments of the present invention include tire treads formed, at least in part, of a rubber composition that is based on at least (phr: parts by weight per hundred parts of elastomer): a diene elastomer; more than 50 phr of an inorganic filler as reinforcing filler; between 2 and 15 phr of an inorganic filler/diene elastomer coupling agent; between 1 and 10 phr of a methylene acceptor, and between 0.5 and 5 phr of a methylene donor.

Particular embodiment of the tire treads may be characterized as presenting a radially increasing rigidity gradient from the surface towards the inside of the tread after mechanical run-in of the tread. An exemplary embodiment of such a tread provides a tread having a nominal secant modulus at 10% elongation of between 3 and 7 MPa at a radially outer surface of the tread and of between 9 and 13 MPa at the most radially inside of the tread after mechanical run-in.

Particular embodiments also include the use of such a tread for the manufacturing of new tires or the recapping of worn tires and treads that are embodiments of the present invention are particularly suited to tires intended to be fitted on passenger vehicles, 4×4 vehicles (having 4 driving wheels), motorcycles, vans and heavy vehicles.

Particular embodiments of the present invention include tires having treads that comprise particular embodiments of the present invention and especially, though not limiting, to embodiments of the present invention that are tires of "winter" type intended for snow-covered or icy roads.

Figure 1:
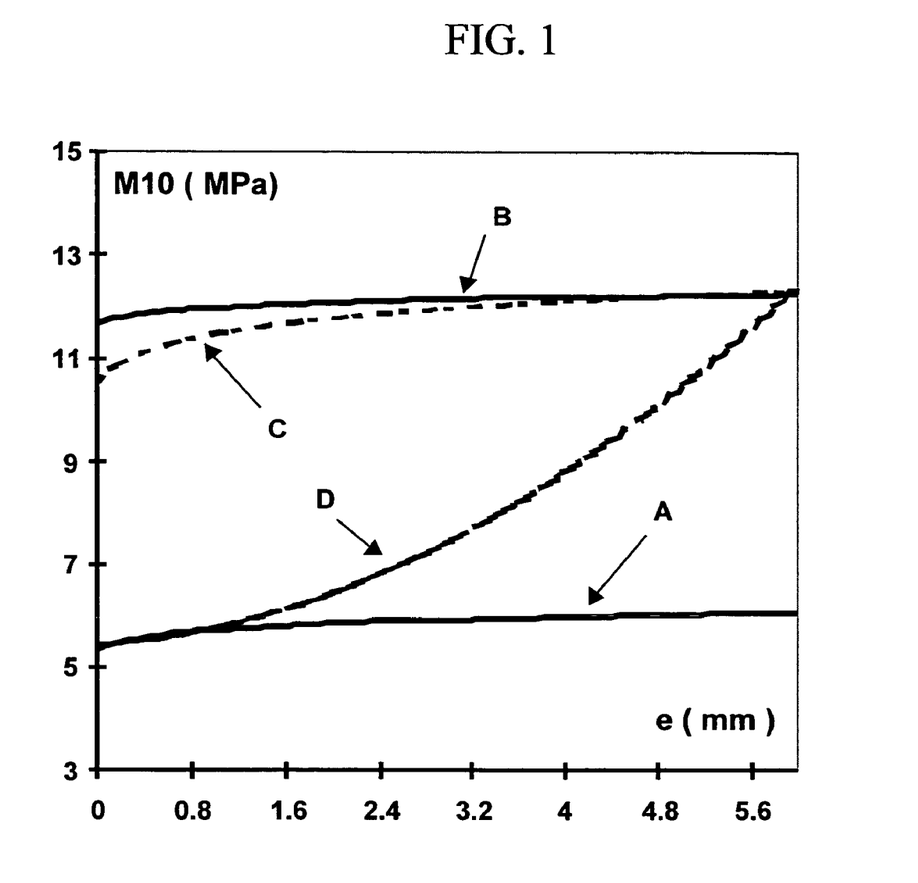
FIG. 1 is a graph showing the relationship of the variation of rigidity (modulus M10) as a function of the depth ("e" in mm) in different treads.

The invention and its advantages will be readily understood in the light of the description and examples of embodiment which follow, and of FIG. 1 relating to these examples.

DETAILED DESCRIPTION OF THE INVENTION

The treads and rubber compositions constituting these treads are characterised, before and after curing as follows:

Mooney plasticity. An oscillating consistometer such as described in French Standard NF T 43-005 (November 1980) is used. The Mooney plasticity is measured in accordance with the following principle: the raw composition (i.e. before curing) is moulded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton·meter).

Scorch time. The measurements are effected at 130° C., in accordance with French Standard NF T 43-005. The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

Tensile tests. These tensile tests make it possible to determine the elasticity stresses and the properties at break. Unless indicated otherwise, they are measured in accordance with French Standard NF T 46-002 of September 1988. The nominal secant moduli (or apparent stresses, in MPa) at 10% elongation (M10), 100% elongation (M100) and 300% elongation (M300) are measured in a second elongation (i.e., after a cycle of accommodation to the amount of extension provided for the measurement itself).

The nominal secant modulus is also measured at 10% elongation, after an accommodation of 15% (i.e. an extension to 15% followed by relaxation to 0%) and not 10% as above for the modulus M10. This so-called "accommodated" modulus is referred to as $M10_{Ac}$. The breaking stresses (in MPa) and the elongations at break (in %) are also measured. All these tensile measurements are effected under normal conditions of temperature (23±2° C.) and humidity (50±5% relative humidity), in accordance with French standard NFT 40-101 (December 1979).

Shore A hardness. The Shore A hardness of the compositions after curing is assessed in accordance with ASTM Standard D 2240-86.

Dynamic properties. The dynamic properties $\Delta G^*$ and tan $(\delta)_{max}$ are measured on a viscoanalyser (Metravib VA4000), in accordance with ASTM Standard D5992-96. The response of a sample of vulcanised composition (cylindrical test piece of a thickness of 4 mm and a section of 400 $mm^2$), subjected to an alternating single sinusoidal shearing stress, at a frequency of 10 Hz, under normal conditions of temperature (23° C.) in accordance with Standard ASTM D 1349-99, is recorded. Scanning was effected at an amplitude of deformation of 0.1 to 50% (outward cycle), then of 50% to 1% (return cycle). The results used are the complex dynamic shear modulus ($G^*$) and the loss factor tan ($\delta$). For the return cycle, the maximum value of tan ($\delta$) which is observed is indicated (tan $(\delta)_{max}$), and the deviation in the complex modulus ($\Delta G^*$) between the values at 0.15% and 50% deformation (Payne effect).

Tests on tires. Shore A hardness: It is measured on the outer surface of the tread, the one in contact with the ground, in accordance with the aforementioned standard ASTM D 2240-86.

Drift thrust: Each tire tested is mounted on a wheel of suitable dimension and inflated to 2.2 bar. It is made to run at a constant speed of 80 km/h on a suitable automatic machine ("flat-belt" type test machine sold by MTS). The load "Z" is varied, at a drift angle of 1 degree, and the rigidity or drift thrust "D" (corrected for the thrust at zero drift) is measured in known manner, by recording the transverse force on the wheel as a function of this load Z using sensors. The drift thrust indicated in the tables is the gradient at the origin of the curve D(Z).

Accommodation or mechanical running-in: Some of the characteristics of the tires tested may be measured both on new tires (that is to say in the initial state, before any running) and on tires which have undergone mechanical "accommodation" of their treads. "Mechanical accommodation" is to be understood to mean here simple running-in of the tire by means of which its tread is placed in contact with the ground during running, that is to say in working conditions, for several tens of seconds or several minutes at the most. This running-in operation may be carried out on an automatic running machine or directly on an automobile, and effected in various ways, for example by simply running in a straight line of several tens or hundreds of meters, by longitudinal braking or alternatively by drifting of the tire (bends), the important thing being to start making the tread "work" under normal conditions of use.

For the requirements of the tire tests which follow, the mechanical accommodation is achieved, unless indicated otherwise in the rest of the text, by what is called "standard" running-in consisting of simple running in a straight line over a length of 400 meters at a speed of 60 km/h, on a given automobile, without drifting or cambering imposed on the tire, followed by moderate longitudinal braking (braking distance from 30 to 40 meters) to stop the vehicle. This "standard running-in" is furthermore effected under normal conditions of pressure (those recommended by the manufacturer of the vehicle used) and load (1 person only on board the vehicle).

Braking on damp ground: The tires are mounted on an automobile fitted with an ABS braking system and the distance necessary to go from 40 km/h to 10 km/h upon sudden braking on wetted ground (asphalt concrete) is measured. A value greater than that of the control, arbitrarily set to 100, indicates an improved result, that is to say a shorter braking distance.

Grip on damp ground: To assess the grip performance on damp ground, the behaviour of the tires mounted on a given automobile travelling round a circuit comprising numerous bends and wetted so as to keep the ground damp, under limit speed conditions is analysed.

On one hand the minimum time necessary to cover the entire circuit is measured; a value less than that of the control, arbitrarily set to 100, indicates an improved result, that is to say a shorter travelling time.

The professional driver of the vehicle, on the other hand, assigns a subjective overall mark for road behaviour of the vehicle—and therefore of the tires—on this wetted circuit comprising bends; a mark greater than that of the control, arbitrarily set to 100, indicates improved overall behaviour.

The treads according to the invention are formed, at least in part, of a rubber composition based on at least: (i) a (at least one) diene elastomer; (ii) a minimum quantity (more than 50 phr) of a (at least one) inorganic filler as reinforcing filler; (iii) a (at least one) coupling agent (between 2 and 15 phr) providing the bond between the reinforcing inorganic filler and this diene elastomer; (iv) a (at least one) acceptor (between 1 and 10 phr) and (v) a (at least one) methylene donor (between 0.5 and 5 phr).

Of course, the expression composition "based on" is to be understood to mean a composition comprising the mix and/or the product of reaction in situ of the various constituents used, some of these base constituents (for example, the coupling agent, the methylene acceptor and donor) being liable to, or intended to, react together, at least in part, during the different phases of manufacturing of the treads, in particular during the vulcanisation (curing) thereof.

Diene elastomer. "Diene" elastomer or rubber is understood to mean, generally, an elastomer resulting at least in part (i.e. a homopolymer or a copolymer) from diene monomers (monomers bearing two double carbon-carbon bonds, whether conjugated or not). "Essentially unsaturated" diene elastomer is understood here to mean a diene elastomer resulting at least in part from conjugated diene monomers, having a content of members or units of diene origin (conjugated dienes) which is greater than 15% (mol %). Thus, for example, diene elastomers such as butyl rubbers or copolymers of dienes and of alpha-olefins of the EPDM type do not fall within this definition, and may on the contrary be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These general definitions being given, the person skilled in the art of tires will understand that the present invention is used first and foremost with highly unsaturated diene elastomers, in particular with:

(a)—any homopolymer obtained by polymerisation of a conjugated diene monomer having 4 to 12 carbon atoms;

(b)—any copolymer obtained by copolymerization of one or more conjugated dienes with each other or with one or more vinyl-aromatic compounds having 8 to 20 carbon atoms.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerisation conditions used, in particular of the presence or absence of a modifying and/or randomising agent and the quantities of modifying and/or randomising agent used. The elastomers may for example be block, statistical, sequential or microsequential elastomers, and may be prepared in dispersion or in solution; they may be coupled and/or starred or alternatively functionalised with a coupling and/or starring or functionalising agent.

Preferred are polybutadienes, and in particular those having a content of 1,2-units between 4% and 80%, or those having a content of cis-1,4 [bonds] of more than 80%, polyisoprenes, butadiene-styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene-isoprene copolymers and in particular those having an isoprene content of between 5% and 90% by weight and a glass transition temperature ("Tg"-measured in accordance with ASTM Standard D3418-82) of between −40° C. and −80° C., isoprene-styrene copolymers and in particular those having a styrene content of between 5% and 50% by weight and a Tg of between −25° C. and −50° C. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene-styrene-isoprene copolymer having a Tg of between −20° C. and −70° C.

In summary, particularly preferably, the diene elastomer of the composition according to the invention is selected from the group of highly unsaturated diene elastomers which consists of polybutadienes (BR), synthetic polyisoprenes (IR), natural rubber (NR), butadiene copolymers, isoprene copolymers and mixtures of these elastomers.

Such copolymers are more preferably selected from the group which consists of butadiene-styrene copolymers (SBR), butadiene-isoprene copolymers (BIR), isoprene-styrene copolymers (SIR), isoprene-butadiene-styrene copolymers (SBIR) and mixtures of such copolymers.

The tread according to the invention is preferably intended for a passenger-car tire. In such a case, the diene elastomer is preferably an SBR copolymer, in particular an SBR prepared in solution, preferably used in a mixture with a polybutadiene; more preferably, the SBR has a content of styrene of between 20% and 30% by weight, a content of vinyl bonds of the butadiene fraction of between 15% and 65%, a content of trans-1,4 bonds of between 15% and 75% and a Tg of between −20° C. and −55° C., and the polybutadiene has more than 90% cis-1,4 bonds.

The compositions of the treads of the invention may contain a single diene elastomer or a mixture of several diene elastomers, the diene elastomer(s) possibly being used in association with any type of synthetic elastomer other than a diene one, or even with polymers other than elastomers, for example thermoplastic polymers.

Reinforcing inorganic filler. "Reinforcing inorganic filler" is to be understood here to mean any inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacturing of a tire tread, in other words which is capable of replacing a conventional tire-grade carbon black (for treads) in its reinforcement function.

Preferably, the reinforcing inorganic filler is a filler of the siliceous or aluminous type, or a mixture of these two types of fillers.

The silica ($SiO_2$) used may be any reinforcing silica known to the person skilled in the art, in particular any precipitated or pyrogenic silica having a BET surface area and a specific CTAB surface area both of which are less than 450 $m^2$/g, preferably from 30 to 400 $m^2$/g. Highly dispersible precipitated silicas (referred to as "HD") are preferred, in particular when the invention is used for the manufacturing of tires having a low rolling resistance; "highly dispersible silica" is understood in known manner to mean any silica having a substantial ability to disagglomerate and to disperse in an elastomeric matrix, which can be observed in known manner by electron or optical microscopy on thin sections. As non-limitative examples of such preferred highly dispersible silicas, mention may be made of the silicas BV3380 and Ultrasil 7000 from Degussa, the silicas Zeosil 1165 MP and 1115 MP from Rhodia, the silica Hi-Sil 2000 from PPG, the silicas Zeopol 8715 or 8745 from Huber, and treated precipitated silicas such as, for example, the aluminium-"doped" silicas described in application EP-A-0 735 088.

The reinforcing alumina ($Al_2O_3$) preferably used is a highly dispersible alumina having a BET surface area from 30 to 400 $m^2$/g, more preferably between 60 and 250 m/g, an average particle size at most equal to 500 nm, more preferably at most equal to 200 nm, as described in the aforementioned application EP-A-0 810 258. Non-limitative examples of such reinforcing aluminas are in particular the aluminas A125 or CR125 (from Baikowski), APA-100RDX (from Condéa), Aluminoxid C (from Degussa) or AKP-G015 (Sumitomo Chemicals). The invention can also be implemented by using as reinforcing inorganic filler the specific aluminium (oxide-) hydroxides such as described in the aforementioned application WO99/28376.

The physical state in which the reinforcing inorganic filler is present is immaterial, whether it be in the form of a powder, microbeads, granules, balls or any other densified form.

Of course, "reinforcing inorganic filler" is also understood to mean mixtures of different reinforcing inorganic fillers, in particular of highly dispersible siliceous and/or aluminous fillers such as described above.

When the treads of the invention are intended for tires of low rolling resistance, the reinforcing inorganic filler used, in particular if it is silica, preferably has a BET surface area of between 60 and 250 $m^2$/g, more preferably between 80 and 230 $m^2$/g.

The inorganic filler used as reinforcing filler must be present in an amount greater than 50 phr, which is one of the essential characteristics of the invention. This reinforcing inorganic filler may constitute all or the majority of the total reinforcing filler, in this latter case associated for example with a minority quantity of carbon black.

Preferably, the amount of reinforcing inorganic filler is between 60 and 120 phr, more preferably still within a range from 70 to 100 phr approximately, in particular when the tread is intended for a passenger-car tire. The person skilled in the art will readily understand that the optimum will be different according to the nature of the reinforcing inorganic filler used and according to the type of tire in question, for example a tire for a motorcycle, passenger vehicle or alternatively for a utility vehicle such as a van or a heavy vehicle.

Preferably, in the tread according to the invention, the reinforcing inorganic filler constitutes more than 80% by weight of the total reinforcing filler, more preferably more than 90% by weight (or even all) of this total reinforcing filler.

However, without significantly affecting the technical effect desired, a small quantity of carbon black, preferably less than 20%, more preferably still less than 10% by weight relative to the quantity of total reinforcing filler, may be used.

The carbon black, if it is used, is preferably present in an amount of between 2 and 15 phr, more preferably between 4 and 12 phr. It can be used in particular as a simple black pigmentation agent, or alternatively to protect the tread from different sources of atmospheric ageing such as ozone, oxidation or UV radiation. On the other hand, it is known that certain rubber-making additives, in particular certain coupling agents, are available in a form supported by carbon black, the use of such additives therefore involving the incorporation, in a small proportion, of carbon black. Suitable carbon blacks are any carbon blacks, in particular the blacks of the type HAF, ISAF and SAF, which are conventionally used in tires, and particularly in treads for these tires; as non-limitative examples of such blacks, mention may be made of the blacks N115, N134, N234, N339, N347 and N375.

In the present specification, the "BET" specific surface area is determined in known manner, in accordance with the method of Brunauer, Emmett and Teller described in "The Journal of the American Chemical Society", vol. 60, page 309, February 1938, and corresponding to French Standard NFT 45-007 (November 1987); the CTAB specific surface area is the external surface area determined in accordance with the same Standard NF T 45-007.

Finally, as filler equivalent to such a reinforcing inorganic filler, there could be used a reinforcing filler of organic type, in particular a carbon black, covered at least in part with an inorganic layer (for example, a layer of silica), which for its part requires the use of a coupling agent to provide the connection to the elastomer.

Coupling agent. In known manner, in the presence of a reinforcing inorganic filler, it is necessary to use a coupling agent, also referred to as bonding agent, the function of which is to provide the connection or bond between the surface of the particles of this inorganic filler and the diene elastomer, while facilitating the dispersion of this inorganic filler within the elastomeric matrix during the thermomechanical kneading.

It will be recalled that (inorganic filler/elastomer) "coupling agent" is to be understood to mean an agent capable of establishing a sufficient chemical and/or physical connection between the inorganic filler and the elastomer; such a coupling agent, which is consequently at least bifunctional, has, for example, the simplified general formula "Y-T-X", in which:

Y represents a functional group (function "Y") which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group (function "X") which is capable of bonding physically and/or chemically with the diene elastomer, for example by means of a sulphur atom; and T represents a divalent organic group making it possible to link Y and X.

The coupling agents must particularly not be confused with simple agents for covering the inorganic filler which, in known manner, may comprise the function Y which is active with respect to the inorganic filler but are devoid of the function X which is active with respect to the elastomer.

Silica/diene elastomer coupling agents, of variable effectiveness, have been described in a very large number of documents and are well-known to the person skilled in the art. Any known coupling agent likely to ensure, in the diene rubber compositions which can be used for the manufacturing of tire treads, the bonding between a reinforcing inorganic filler such as silica and a diene elastomer, in particular organosilanes or polyfunctional polyorganosiloxanes bearing the functions X and Y mentioned above, may be used.

In particular polysulphurized silanes, which are referred to as "symmetrical" or "asymmetrical" depending on their specific structure, are used, such as those described for example in the patents or patent applications FR 2 149 339, FR 2 206 330, U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, U.S. Pat. No. 5,580,919, U.S. Pat. No. 5,583,245, U.S. Pat.

No. 5,650,457, U.S. Pat. No. 5,663,358, U.S. Pat. No. 5,663, 395, U.S. Pat. No. 5,663,396, U.S. Pat. No. 5,674,932, U.S. Pat. No. 5,675,014, U.S. Pat. No. 5,684,171, U.S. 5,684,172, U.S. Pat. No. 5,696,197, U.S. Pat. No. 5,708,053, U.S. Pat. No. 5,892,085, EP 1 043 357.

Particularly suitable for implementing the invention, without the definition below being limitative, are so-called "symmetrical" polysulphurized silanes which satisfy the following general formula (1):

in which:
n is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene); and
Z corresponds to one of the formulae below:

in which:
the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl); and
the radicals $R^2$, which may or may not be substituted, and may be identical or different, represent a $C_1$-$C_{18}$ alkoxyl group or a $C_5$-$C_{18}$ cycloalkoxyl group (preferably a group selected from among $C_1$-$C_8$ alkoxyls and $C_5$-$C_8$ cycloalkoxyls, more preferably still a group selected from among $C_1$-$C_4$ alkoxyls, in particular methoxyl and/or ethoxyl).

In the case of a mixture of polysulphurized alkoxysilanes in accordance with Formula (1) above, in particular conventional, commercially available, mixes, the average value of the "n"s is a fractional number, preferably between 2 and 5, more preferably close to 4. However, the invention may also be implemented advantageously for example with disulphurised alkoxysilanes (n=2).

As examples of polysulphurized silanes, mention will be made more particularly of the polysulphides (in particular disulphides, trisulphides or tetrasulphides) of bis-(($C_1$-$C_4$) alkoxyl-($C_1$-$C_4$)alkylsilyl($C_1$-$C_4$)alkyl), such as for example the polysulphides of bis(3-trimethoxysilylpropyl) or of bis(3-triethoxysilylpropyl). Of these compounds, in particular bis (3-triethoxysilylpropyl) tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used.

TESPD is sold, for example, by Degussa under the name Si75 (in the form of a mixture of disulphide—75% by weight—and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4).

By way of examples of coupling agents other than the aforementioned polysulphurized alkoxysilanes, mention will be made in particular of the bifunctional polyorganosiloxanes such as described for example in the aforementioned application WO99/02602.

In the treads according to the invention, the content of coupling agent is preferably between 4 and 12 phr, more preferably between 3 and 8 phr. However, it is generally desirable to use as little as possible thereof.

Relative to the weight of reinforcing inorganic filler, the amount of coupling agent preferably represents between 0.5 and 15% by weight relative to the quantity of reinforcing inorganic filler. More preferably, in the case of treads for tires for passenger vehicles, the coupling agent is present in an amount less than 12%, or even less than 10% by weight relative to this quantity of reinforcing inorganic filler.

The polysulphurized alkoxysilane could first be grafted (via the function "X") on to the diene elastomer of the composition of the invention, the elastomer thus functionalised or "precoupled" then comprising the free function "Y" for the reinforcing inorganic filler. The polysulphurized alkoxysilane could also be grafted beforehand (via the function "Y") on the reinforcing inorganic filler, the thus "precoupled" filler then being able to be bonded to the diene elastomer by means of the free function "X". However, it is preferred, in particular for reasons of better processing of the compositions in the uncured state, to use the coupling agent, either grafted onto the reinforcing inorganic filler, or in the free (i.e. non-grafted) state.

There may possibly be associated with the coupling agent an appropriate "coupling activator", that is to say, a body (single compound or association of compounds) which, when mixed with this coupling agent, increases the effectiveness of the latter. Coupling activators for polysulphurized alkoxysilanes have for example been described in the aforementioned international applications WO00/05300 and WO00/05301, consisting of the association of a substituted guanidine, in particular N,N'-diphenylguanidine (abbreviated to "DPG"), with an enamine or a zinc dithiophosphate. The presence of these coupling activators will make it possible, for example, to keep the amount of coupling agent at a preferred level of less than 10%, or even less than 8% by weight relative to the quantity of reinforcing inorganic filler, or alternatively to reduce the amount of reinforcing inorganic filler owing to the improved coupling with the diene elastomer.

Methylene Acceptor/Donor System (so-called "M.A.D." system). The terms "methylene acceptor" and "methylene donor" are well-known to the person skilled in the art and are widely used to designate compounds liable to react together to generate a three-dimensional reinforcing resin by condensation.

The rubber compositions of the treads of the invention contain, in combination, at least one methylene acceptor associated with at least one methylene donor, which are intended to form in situ, after curing (vulcanisation) of the tread, a three-dimensional resin lattice which is superposed and interpenetrates with the (inorganic filler/elastomer) lattice on one hand, and with the (elastomer/sulphur) lattice on the other hand (if the cross-linking agent is sulphur).

Methylene acceptors, in particular novolac resins, whether or not associated with a methylene donor, had admittedly already been described in rubber compositions, in particular those intended for tires or treads for tires, for applications as varied as grip or reinforcement: reference will be made, for example, to documents EP-A-0 967 244, U.S. Pat. No. 6,028, 137, U.S. Pat. No. 6,015,851, U.S. Pat. No. 5,990,210, U.S. Pat. No. 5,872,167, U.S. Pat. No. 5,859,115 or EP-A-0 736

399, U.S. Pat. No. 5,840,113 or EP-A-0 875 532, U.S. Pat. No. 5,405,897, U.S. Pat. No. 5,049,418 and U.S. Pat. No. 4,837,266.

However, as far as the Applicant is aware, no document of the prior art describes the use in a tire tread, in the proportions set forth here, of such an M.A.D. system in combination with a so high amount (more than 50 phr, preferably more than 60 phr) of a reinforcing inorganic filler such as silica.

Methylene acceptor. In known manner, the term "methylene acceptor" designates the reactant with which the methylene donor compound reacts by formation of methylene bridges (—CH2-), upon the curing of the composition, thus resulting in the formation in situ of the three-dimensional resin lattice.

The methylene acceptor must be able to disperse perfectly in the rubber matrix, at the same time as the reinforcing inorganic filler and its coupling agent.

Particularly suitable are phenols, the generic name for hydroxylated derivatives of arenes and the equivalent compounds; such a definition covers in particular monophenols, for example phenyl proper or hydroxybenzene, bisphenols, polyphenols (polyhydroxyarenes), substituted phenols such as alkylphenols or aralkylphenols, for example bisphenols, diphenylolpropane, diphenylolmethane, naphthols, cresol, t-butylphenol, octylphenol, nonylphenol, xylenol, resorcinol or analogous products.

Preferably phenolic resins referred to as "novolac resins", also called phenol-aldehyde precondensates, resulting from the precondensation of phenolic compounds and aldehydes, in particular formaldehyde, are used. In known manner, these novolac resins (also referred to as "two-step resins") are thermoplastic and require the use of a curing agent (methylene donor) to be cross-linked, unlike, for example, resols which are thermohardening; they have sufficient plasticity not to interfere with the processing of the rubber composition. After cross-linking by the methylene donor (they may then be referred to as "thermohardening" novolac resins), they are characterised in particular by a tighter three-dimensional lattice than that of the resols.

The quantity of methylene acceptor must be between 1 and 10 phr; below the minimum indicated, the technical effect desired is inadequate, whereas beyond the maximum indicated there are the risks of excessive stiffening and excessive compromising of the hysteresis. For all these reasons, a quantity of between 2 and 8 phr is more preferably selected, amounts lying within a range from 3 to 6 phr being particularly advantageous in the case of treads for passenger-car tires.

Finally, the quantity of methylene acceptor, in the ranges indicated above, is advantageously adjusted so as to represent between 2% and 15%, more preferably between 4% and 10%, by weight relative to the quantity of reinforcing inorganic filler.

Methylene donor. A curing agent, capable of cross-linking or hardening the methylene acceptor previously described, also commonly referred to as "methylene donor", must be associated with this acceptor. The cross-linking of the resin is then caused during the curing of the rubber matrix, by formation of (—CH$_2$—) bridges.

Preferably, the methylene donor is selected from the group consisting of hexamethylenetetramine (abbreviated to HMT), hexamethoxymethylmelamine (abbreviated to HMMM or H3M), hexaethoxymethylmelamine, formaldehyde polymers such as p-formaldehyde, N-methylol melamine derivatives, or mixtures of these compounds. More preferably, a methylene donor selected from among HMT, H3M or a mixture of these compounds is used.

The quantity of methylene donor must be between 0.5 and 5 phr; below the minimum indicated, the technical effect desired has proved inadequate, whereas beyond the maximum indicated there is the risk of impairing the processing in the uncured state of the compositions (for example, problem of solubility of the HMT) or the vulcanisation (slowed down in the presence of H3M). For all these reasons, a quantity of between 0.5 and 3.5 phr is more preferably selected, amounts lying within a range from 1 to 3 phr being particularly advantageous in the case of treads for passenger-car tires.

Finally, the quantity of methylene donor, in the ranges indicated above, is advantageously adjusted so as to represent between 10% and 80%, more preferably within a range from 40% to 60%, by weight relative to the quantity of methylene acceptor.

Various additives. Of course, the rubber compositions of the treads according to the invention also comprise all or part of the additives usually used in sulphur-cross-linkable diene rubber compositions intended for the manufacturing of treads, such as, for example, plasticisers, pigments, protective agents of the type antioxidants, antiozonants, a cross-linking system based either on sulphur or on sulphur and/or peroxide and/or bismaleimide donors, vulcanisation accelerators, vulcanisation activators, extender oils, etc. There may also be associated with the reinforcing inorganic filler, if necessary, a conventional non-reinforcing white filler, such as for example particles of clay, bentonite, talc, chalk, kaolin or titanium oxides.

The rubber compositions of the treads of the invention may also contain, in addition to the coupling agents, agents for covering the reinforcing inorganic filler (comprising for example the single function Y), or more generally processing aids liable, in known manner, owing to an improvement in the dispersion of the inorganic filler in the rubber matrix and to a reduction in the viscosity of the compositions, to improve their ability to be worked in the uncured state, these agents being, for example, alkylalkoxysilanes, (in particular alkyltriethoxysilanes), polyols, polyethers (for example polyethylene glycols), primary, secondary or tertiary amines, hydroxylated or hydrolysable polyorganosiloxanes, for example α,ω-dihydroxypolyorganosiloxanes (in particular α,ω-dihydroxy-polydimethylsiloxanes).

Manufacturing of the treads. The rubber compositions of the treads of the invention are manufactured in suitable mixers, using two successive preparation phases in accordance with a general process well-known to the person skilled in the art (see for example documents EP-A-0 501 227 or WO00/05300 mentioned above): a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically less than 120° C., for example between 60° C. and 100° C., during which finishing phase the cross-linking or vulcanisation system is incorporated.

The process according to the invention, for preparing a sulphur-vulcanizable tire tread, liable to have, after mechanical running-in of the tire for which it is intended, a rigidity gradient radially increasing from the surface towards the inside of the tread, comprises the following steps:

incorporating in a diene elastomer, with a mixer, more than 50 phr of an inorganic filler as reinforcing filler; between 2 and 15 phr of an inorganic filler/diene elastomer coupling agent; and between 1 and 10 phr of a methylene acceptor, thermomechanically kneading the entire mixture, in one or more stages, until a maximum temperature of between 130° C. and 200° C. is reached;

cooling the entire mixture to a temperature of less than 100° C.; and then incorporating: between 0.5 and 5 phr of a methylene donor and a vulcanisation system;

kneading the entire mixture until a maximum temperature of less than 120° C.;

extruding or calendering the rubber composition thus obtained, in the form of a tire tread.

According to a preferred embodiment of the invention, all the base constituents of the compositions of the treads according to the invention, with the exception of the methylene donor and the vulcanization system, namely the reinforcing inorganic filler, the coupling agent (and any activator), and the methylene acceptor are incorporated intimately by kneading in the diene elastomer during the first, so-called non-productive, phase, that is to say that at least these different base constituents are introduced into the mixer and are kneaded thermomechanically, in one or more stages, until the maximum temperature of between 130° C. and 200° C., preferably between 145° C. and 185° C., is reached.

More preferably, during this first non-productive phase, the methylene acceptor is incorporated in the mixer later than the elastomer, the reinforcing inorganic filler and its coupling agent, when the temperature of the composition in the mixer, during kneading, has reached a value of between 80° C. and 130° C., more preferably between 90° C. and 110° C. In actual fact, better effectiveness of the M.A.D. system was noted for such temperature conditions.

By way of example, the first (non-productive) phase is effected in a single thermomechanical step during which all the necessary constituents, any additional covering agents or, processing agents and various other additives, with the exception of the methylene donor and the vulcanization system, are introduced into a suitable mixer, such as a conventional internal mixer. A second stage of thermomechanical working may possibly be added, in this internal mixer, for example after an intermediate cooling stage (preferably to a temperature of less than 100° C.), with the aim of making the compositions undergo complementary heat treatment, in particular in order to improve the dispersion, in the elastomeric matrix, of the reinforcing inorganic filler, the coupling agent and the methylene acceptor.

After cooling the mixture thus obtained during the first non-productive phase, the methylene donor and the vulcanisation system are then incorporated at low temperature, generally in an external mixer such as an open mill; the entire composition is then mixed (productive phase) for several minutes, for example between 5 and 15 minutes.

The vulcanisation system proper is preferably based on sulphur and a primary vulcanization accelerator, in particular an accelerator of the sulphenamide type. To this vulcanization system there are added, incorporated during the first non-productive phase and/or during the productive phase, various known secondary accelerators or vulcanization activators such as zinc oxide, stearic acid, guanidine derivatives (in particular diphenylguanidine), etc. The amount of sulphur is preferably between 0.5 and 3.0 phr, and the amount of the primary accelerator is preferably between 0.5 and 5.0 phr.

The final composition thus obtained is then calendered, for example in the form of a film or a sheet, in particular for characterisation in the laboratory, or alternatively extruded in the form of a rubber profiled element usable directly as a tire tread.

The vulcanization (or curing) is carried out in known manner at a temperature generally between 130° C. and 200° C., for a sufficient time which may vary, for example, between 5 and 90 minutes, depending, in particular, on the curing temperature, the vulcanization system adopted and the vulcanization kinetics of the composition in question.

In the process according to the invention, in accordance with the preceding information given for the rubber compositions, particular embodiments include at least one while other embodiments include all of the following characteristics being satisfied:

the quantity of reinforcing inorganic filler is between 60 and 120 phr;

the quantity of coupling agent is between 4 and 12 phr;

the quantity of methylene acceptor is between 2 and 8 phr;

the quantity of methylene donor is between 0.5 and 3.5 phr;

the maximum thermomechanical kneading temperature is between 145° C. and 180° C.;

the reinforcing inorganic filler is a siliceous or aluminous filler;

the quantity of carbon black is between 2 and 15 phr;

the at least bifunctional coupling agent is an organosilane or a polyorganosiloxane;

the methylene acceptor is selected from the group consisting of phenolic resins;

the methylene donor is selected from the group consisting of HMT, H3M, hexaethoxymethylmelamine, paraformaldehyde polymers, N-methylol derivatives of melamine, or a mixture of these compounds;

the quantity of methylene acceptor is between 2% and 15% by weight relative to the weight of reinforcing inorganic filler;

the quantity of methylene donor represents between 10% and 80% by weight relative to the weight of methylene acceptor.

the diene elastomer is a butadiene-styrene copolymer (SBR), preferably used in a mixture with a polybutadiene; and the reinforcing inorganic filler represents more than 80% of the total reinforcing filler.

Certain embodiments in this process of the present invention include at least one and other embodiments include all of the following characteristics being satisfied:

the quantity of inorganic filler lies within a range from 70 to 100 phr;

the quantity of coupling agent is between 3 and 8 phr;

the quantity of methylene acceptor lies within a range from 3 to 6 phr;

the quantity of methylene donor lies within a range from 1 to 3 phr;

the reinforcing inorganic filler is silica;

the quantity of carbon black is between 4 and 12 phr;

the coupling agent is a bis-($C_1$-$C_4$)alkoxylsilylpropyl polysulphide;

the methylene acceptor is a novolac phenolic resin;

the methylene donor is selected from the group consisting of HMT, H3M or a mixture of these compounds;

the quantity of methylene acceptor is between 4% and 10% by weight relative to the weight of reinforcing inorganic filler;

the quantity of methylene donor represents from 40% to 60% by weight relative to the weight of methylene acceptor;

the SBR is an SBR prepared in solution and the polybutadiene has more than 90% cis-1,4 bonds; and the reinforcing inorganic filler represents more than 90% of the total reinforcing filler.

The rubber compositions previously described, based on diene elastomer, a high amount of reinforcing inorganic filler, a coupling agent and a methylene acceptor/donor system, in the proportions indicated above, may advantageously constitute the entire tread according to the invention.

However, the invention also applies to those cases in which these rubber compositions comprising the M.A.D. system form only part of a composite tread such as described for example in the introduction to the present specification, formed of two radially superposed layers of different rigidity (so-called "cap-base" structure), both intended to come into contact with the road during running of the tire, during the life of the latter.

The part based on the M.A.D. system may then constitute the radially outer layer of the tread which is intended to come into contact with the ground from the start of running of the new tire, or on the contrary its radially inner layer which is intended to come into contact with the ground later, in those cases in which it is desired, for example, to "retard" the technical effect of auto-accommodation provided by the invention.

Of course, the invention relates to the treads previously described, both in the uncured state (i.e. before curing) and in the cured state (i.e. after cross-linking or vulcanization).

EXAMPLES

Preparation of the rubber compositions and treads. For the following tests, the procedure is as follows: the reinforcing filler, the coupling agent and any associated coupling activator, the diene elastomer or the mixture of diene elastomers, the methylene acceptor and the various other ingredients, with the exception of the vulcanization system and the methylene donor, are introduced in succession into an internal mixer filled to 70% of capacity, the initial tank temperature of which is approximately 60° C. Thermomechanical working (non-productive phase) is then performed in one stage, of a duration of about 3 to 4 minutes in total, until a maximum "dropping" temperature of 165° C. is obtained. In these tests, the methylene acceptor is introduced into the mixer when the composition under kneading has reached a temperature close to 100° C.

The mixture thus obtained is recovered, it is cooled and then the sulphur, sulphenamide accelerator and methylene donor are incorporated on an external mixer (homo-finisher) at 30° C., by mixing everything (productive phase) for an appropriate time, of between 5 and 12 minutes depending on the case.

The compositions thus obtained are then calendered either in the form of plates (thickness of 2 to 3 mm) or of thin sheets of rubber in order to measure their physical or mechanical properties, or extruded in the form of treads for passenger-car tires.

In all the tests which follow, the reinforcing inorganic filler (silica type "HD") is present in an amount greater than 60 phr; it furthermore constitutes more than 90% by weight of all the reinforcing filler, a minority fraction (less than 10%) of the latter being constituted by carbon black.

Test 1. In this first test, four rubber compositions are compared, based on known SBR and BR diene elastomers, reinforced by carbon black or silica, used as treads for tires for passenger vehicles.

These four compositions C-1 to C-4 are distinguished essentially by the following characteristics:

C-1: reinforced with carbon black (70 phr), without M.A.D. system;
C-2: reinforced with carbon black (70 phr), with M.A.D. system;
C-3: reinforced with silica (80 phr), without M.A.D. system;
C-4: reinforced with silica (80 phr), with M.A.D. system.

The compositions C-1 and C-3 constitute the controls "black" and "silica" of this test. Their respective formulations were adjusted to as to bring them both to initial iso-rigidity (Shore A hardness and modulus M10 equivalent), before incorporation of the M.A.D. system.

Composition C-3 furthermore contains the TESPT coupling agent (amount of 8% by weight relative to the quantity of silica) and the DPG (about 2.6% by weight relative to the quantity of silica). In this composition C-3, the carbon black is essentially used as black pigmentation agent, and is present in a very small amount (6 phr, or approximately 7% of the total reinforcing filler).

Compositions C-2 and C-4 correspond respectively to compositions C-1 and C-3 to which the M.A.D. system has been added; only the tread comprising composition C-4 is therefore in accordance with the invention.

Tables 1 and 2 show the formulation of the different compositions (Table 1—amounts of the different products expressed in phr), and their properties before and after curing (40 min at 150° C.).

TABLE 1

| | Composition No.: | | | |
|---|---|---|---|---|
| | C-1 | C-2 | C-3 | C-4 |
| SBR (1) | 70 | 70 | 70 | 70 |
| BR (2) | 30 | 30 | 30 | 30 |
| carbon black (3) | 70 | 70 | 6 | 6 |
| silica (4) | — | — | 80 | 80 |
| coupling agent (5) | — | — | 6.4 | 6.4 |
| methylene acceptor (6) | — | 6 | — | 6 |
| oil (7) | 20 | 20 | 39 | 39 |
| DPG (8) | — | — | 2.1 | 2.1 |
| ZnO | 2.5 | 2.5 | 2.5 | 2.5 |
| stearic acid | 2 | 2 | 2 | 2 |
| antioxidant (9) | 1.9 | 1.9 | 1.9 | 1.9 |
| methylene donor (10) | — | 2 | — | 2 |
| sulphur | 1.5 | 1.5 | 1.5 | 1.5 |
| accelerator (11) | 1.5 | 1.5 | 1.5 | 1.5 |

(1) SBR (expressed in dry SBR) extended with 37.5% by weight (26.25 phr) of oil (or a total of 96.25 phr of extended SBR); 26.5% styrene, 59.5% 1-2-polybutadiene units and 23% trans-1-4-polybutadiene units (Tg = −29° C.);
(2) BR with 4.3% of 1-2; 2.7% of trans; 93% of cis 1-4 (Tg = −106° C.);
(3) carbon black N234;
(4) silica "Zeosil 1165 MP" from Rhodia, type "HD"; (BET and CTAB: approximately 160 m$^2$/g);
(5) TESPT coupling agent ("Si69" from Degussa);
(6) formo-phenol novolac resin ("Peracit 4536K" from Perstorp);
(7) total aromatic oil (including extender oil for the SBR);
(8) diphenylguanidine (Perkacit DPG from Flexsys);
(9) N-1,3-dimethylbutyl-N-phenylparaphenylenediamine (Santoflex 6-PPD from Flexsys);
(10) HMT (from Degussa);
(11) N-cyclohexyl-2-benzothiazyl sulphenamide (Santocure CBS from Flexsys).

TABLE 2

| | Composition No.: | | | |
|---|---|---|---|---|
| | C-1 | C-2 | C-3 | C-4 |
| Properties before curing: | | | | |
| Mooney (MU) | 100 | 105 | 75 | 70 |
| T5 (min) | 15 | 10 | 19 | 13 |
| Properties after curing: | | | | |
| M10 (MPa) | 5.5 | 11.8 | 6.0 | 12.0 |
| M100 (MPa) | 1.85 | 2.3 | 1.9 | 2.2 |
| M300 (MPa) | 2.2 | 2.0 | 2.15 | 1.6 |

TABLE 2-continued

|  | Composition No.: | | | |
|---|---|---|---|---|
|  | C-1 | C-2 | C-3 | C-4 |
| Shore A | 65 | 79 | 66 | 80 |
| $\Delta G^*$ | 10 | 17 | 6.8 | 10 |
| $\tan(\delta)_{max}$ | 0.38 | 0.43 | 0.32 | 0.39 |
| $M10_{Ac}$ | 4.4 | 9.1 | 4.8 | 7.2 |
| Breaking stress (MPa) | 20 | 19 | 19 | 15 |
| Elongation at break (%) | 590 | 550 | 540 | 620 |

Comparison, first of all, of the control compositions C-1 and C-3 (devoid of M.A.D. system) results in the following observations:

- in the uncured state, a lower Mooney viscosity of composition C-2 based on silica and a slightly increased scorching time, which is beneficial to the processing of the composition;
- after curing, an equivalent rigidity (identical Shore A hardnesses; moduli at low deformation M10 very close) and identical reinforcement properties (identical moduli at the high deformations (M100 and M300), equivalent mechanical properties at break, except for the accuracy of measurement);
- finally, expectedly, a lower hysteresis (lower values of $\Delta G^*$ and $\tan(\delta)_{max}$) for composition C-2 based on silica, which is synonymous with a lower rolling resistance.

After incorporation of the M.A.D. system, the following modifications of properties are observed for the two types of compositions (compare C-2 with C-1 on one hand, and C-4 with C-3 on the other hand):

- in the uncured state, a Mooney viscosity which is little modified, a reduction in T5 in both cases (C-2 and C-4), with values T5 (at least 10 min) which nevertheless offer a sufficient safety margin with respect to the problem of scorching;
- a substantial increase in the hysteresis in both cases; it will however be noted that the values of $\Delta G^*$ and $\tan(\delta)_{max}$ measured on the composition based on silica (C-4) remain at a low level, substantially equal to that of the control composition C-1 filled with carbon black, which constitutes a significant advantage for the silica-based tread;
- finally, a great rise in the value of modulus at low deformation (values M10 practically doubled) and in the Shore hardness (increased by about 20%).

These results may be regarded as expected. In particular, the very distinct increase in rigidity (Shore hardness and modulus at low deformation M10), due to the presence of the M.A.D. system in these compositions C-2 and C-4, enables the person skilled in the art to expect, for tires mounted on automobiles the treads of which are formed of such compositions, certainly an improvement in the road behaviour owing to an increased drift thrust, but above all a crippling drop in the grip performance on wet ground.

However, one significant difference must be noted between compositions C-2 and C-4, this difference relating to the evolution of the modulus ($M10_{Ac}$) at low deformation, after mechanical accommodation (15%).

In the case of the control composition C-2 (carbon black), it will be noted that the modulus $M10_{Ac}$ remains very high after accommodation (9.1 MPa compared with an initial 5.5 MPa on composition C-1, or approximately 65% greater); on the contrary, this same modulus $M10_{Ac}$ drops very greatly (from 12.0 MPa to 7.2 MPa) for composition C-4 (silica), recovering practically the initial value M10 (6.0 MPa) recorded for the control composition C-3 devoid of M.A.D. system.

Such a difference in response between the two compositions, in the presence of the M.A.D. system, is totally unexpected; it justifies these first results now facing real tire running tests, as set forth in Test 2 below.

Test 2 (running tests for tires). Compositions C-1 to C-4 previously described are used in this test as treads for radial carcass passenger-car tires, of dimension 195/65 R15 (speed index H), conventionally manufactured and identical in all points except for the rubber composition constituting the tread.

These tires are marked P-1 to P-4 and correspond to compositions C-1 to C-4, respectively; they were first tested on a machine to determine their initial Shore A hardness (on tread) and their drift thrust.

They were then mounted on a passenger vehicle in order to be subjected to the braking and grip tests described in section I-6 above, in accordance with the following specific conditions:

- braking on damp ground: vehicle Renault model Laguna (front and rear pressure: 2.0 bar), the tires to be tested being mounted at the front of the vehicle;
- travel on a damp circuit comprising bends: vehicle BMW model 328 (front pressure 2.0 bar; rear pressure: 2.4 bar), the tires to be tested being mounted at the front and at the rear of the vehicle.

Finally, their Shore A hardness was also measured after "standard running-in", as previously described, on the Renault Laguna vehicle. The results are shown in Table 3.

TABLE 3

|  | Tires: | | | |
|---|---|---|---|---|
|  | P-1 | P-2 | P-3 | P-4 |
| Initial Shore A hardness: | 67 | 79 | 67 | 80 |
| (evolution in r.u.) | (100) | (118) | (100) | (119) |
| Drift thrust (r.u.): | 100 | 130 | 100 | 130 |
| Braking on damp ground (r.u.): | 100 | 80 | 100 | 108 |
| Performance on a damp circuit comprising bends (r.u.): | | | | |
| travelling time: | 100 | 107 | 100 | 97 |
| behaviour mark: | 100 | 75 | 100 | 110 |
| Shore A hardness after "standard running-in": | 67 | 78 | 66 | 70 |
| (evolution in r.u.) | (100) | (116) | (99) | (106) |

The following comments may be made regarding the results shown in Table 3:

- it will be noted first of all that the Shore A hardnesses measured right at the surface of the treads of the new tires ("initial" Shore A hardnesses) are virtually equal to those measured on rubber test pieces (corresponding compositions C-1 to C-4—see Table 2 above), whatever the type of reinforcing filler used (carbon black or silica); the addition of the M.A.D. system results in both cases in a distinct increase in Shore hardness, of about 13 points (from 67 points to 79-80 points);
- this increase in rigidity of the tread, for the two types of tires P-2 and P-4, is accompanied predictably by a very great increase in the drift thrust (+30%), which is a clear indicator to the person skilled in the art of improved road behaviour (on dry ground);
- as far as the braking performance on damp ground is concerned, it will be noted first of all that the control tires P-1 and P-3, which are devoid of the M.A.D. system, exhibit an equivalent performance (base 100 used for the tire P-1);

after incorporation of the M.A.D. system, the control tire P-2, the tread of which is reinforced with carbon black, exhibits a crippling drop (20% loss) in this braking performance, which was furthermore entirely predictable, taking into account the great stiffening of the tread provided by the M.A.D. system;

the unexpected result lies in the behaviour of the tire of the invention P-4, the tread of which is reinforced with silica: not only is its braking performance on wet ground not degraded—which is already a very surprising result for the person skilled in the art—but it is substantially improved since an improvement of 8% is obtained relative to the control tires P-1 and P-3; this behaviour is entirely noteworthy and radically opposed to that of the control tire P-2;

as for the running test on a damp circuit comprising bends, it confirms that the incorporation of the M.A.D. system in the conventional tread filled with carbon black (tire P-2) results in an unacceptable drop in grip, which is illustrated both by an increase in the minimum time necessary to travel round the circuit at limit speed conditions (plus 7%) and by a reduction in the behaviour mark attributed by the driver (drop of 25%, which is very significant for such a test);

whereas the incorporation of the same M.A.D. system in the tread of the invention filled with silica (tire P-4) results on the contrary in a very significant improvement in performance: time to travel round the circuit significantly reduced (improvement of 3%) compared with the control tires, better behaviour mark (improvement of 10%);

correlatively to the running results above, it will be noted that after mechanical accommodation ("standard running-in"), the Shore A surface hardness remains unchanged (except for the accuracy of measurement) on the control tires P-1, P-2 and P-3, whereas it drops very significantly (less 10 points) on the tire P-4 according to the invention; this remarkable behaviour furthermore recalls the evolution of the modulus $M10_{Ac}$ observed on the corresponding rubber compositions (C-1 to C-4) in Test 1 above.

In summary, the tire according to the invention P-4, entirely unexpectedly, exhibits a simultaneous increase in two properties which however have been deemed contradictory, namely road behaviour (drift thrust) and grip on wet ground.

It must be deduced from this that, necessarily, the three-dimensional resin lattice provided by the M.A.D. system in the rubber compositions of the treads is "expressed" differently depending on whether these compositions are filled conventionally with carbon black, or rather with a reinforcing inorganic filler such as silica, in the recommended high amount.

Test 3. This third test, a posteriori, provides an explanation for the improved results of Tests 1 and 2 above, by revealing an unexpected property for the tread of the invention: the latter in fact has, in the radial direction, a very marked rigidity gradient, with an increasing rigidity when moving from the surface towards the inside of the tread; such a characteristic does not exist in the control tread filled with carbon black.

FIG. 1 represents, for the treads of tires P-2 and P-4 of the previous test, the evolution of modulus M10 (in MPa) as a function of the depth "e" (from 0 to 6 mm), before (as-new state) and after "standard running-in" of these tires on the aforementioned Renault Laguna vehicle.

In order to obtain these rigidity profiles, strips of tread were cut out, at regular intervals of depth "e" (for example every 2/10 mm), practically over the entire thickness of this tread (approximately 7 mm); then these strips were subjected to traction to determine their modulus M10 as a function of their depth "e" in the tread, measured relative to the surface (e=0 mm) of the latter.

More precisely, there are the following correspondences:

the curve A corresponds to the control tires P-1 and P-3, that is to say to the treads without M.A.D. system, the profiles of modulus essentially coinciding (except for the accuracy of measurement) between the two types of reinforcing filler used (carbon black or silica);

the curve B corresponds to the tires P-2 and P-4, that is to say to the treads with M.A.D. system, these tires being new, that is to say before any mechanical running-in or accommodation; here too, the profiles of modulus essentially coincide between carbon black and silica;

the curve C corresponds to the tire P-2 (carbon black) after running-in;

the curve D corresponds to the tire P-4 (silica) after running-in.

After running-in, radically different behaviour is observed between the tires P-2 and P-4:

the surface rigidity and the rigidity at depth are little different for the tire P-2 of the prior art, the reinforcing filler of which is carbon black;

whereas, in the case of the tire P-4 of the invention, the surface rigidity is very significantly less, practically equal to that of the control tires P-1 and P-3, with furthermore a very marked radial rigidity gradient, which increases on moving from the surface of the tread towards the inside of the latter.

It should perhaps be deduced from the curves A to D above, and from all the above results, that the three-dimensional stiffening lattice formed by the M.A.D. system has lower solidity in the case of the tread filled with silica than in the case of the conventional tread filled with carbon black.

Due to this relative fragility, stresses of low amplitude, typical of those experienced during running by the surface part of the tread, would be sufficient to break the surface resin lattice, and thus to make the surface part of the tread more flexible and less rigid, and thus make it recover the excellent grip performance which it has in the absence of the M.A.D. system. On the other hand, in depth, the lattice resin would be little affected by running, all the more so as one penetrates inside this tread, thus guaranteeing the additional rigidity sufficient for improved road behaviour (greater drift thrust).

Test 4. In this new test, five rubber compositions are compared, all reinforced with silica (80 phr) and a small proportion (6 phr) of carbon black as black pigmentation agent, these compositions also being used as treads for tires for passenger vehicles.

The control composition (C-5) is devoid of M.A.D. system, whereas the other four (C-6 to C-9) comprise such a system; the methylene acceptor is formed by different variants of novolac resins (6 phr), the methylene donor being HMT (2 phr). Each composition comprises in particular a coupling agent for the silica. The treads comprising the compositions C-6 to C-9 are therefore all in accordance with the invention. Tables 4 and 5 show the precise formulation of the different compositions (Table 4—amounts of the different products expressed in phr), and their properties before and after curing (40 min at 150° C.).

TABLE 4

| | Composition No.: | | | | |
|---|---|---|---|---|---|
| | C-5 | C-6 | C-7 | C-8 | C-9 |
| SBR (1) | 60 | 60 | 60 | 60 | 60 |
| BR (2) | 40 | 40 | 40 | 40 | 40 |
| carbon black (3) | 6 | 6 | 6 | 6 | 6 |
| silica (4) | 80 | 80 | 80 | 80 | 80 |
| coupling agent (5) | 6.4 | 6.4 | 6.4 | 6.4 | 6.4 |
| methylene acceptor (6) | — | 6 | 6 | 6 | 6 |
| oil (7) | 39 | 39 | 39 | 39 | 39 |
| DPG (8) | 1.5 | 1.5 | 1.5 | 1.5 | 1.5 |
| ZnO | 2.5 | 2.5 | 2.5 | 2.5 | 2.5 |
| stearic acid | 2 | 2 | 2 | 2 | 2 |
| antioxidant (9) | 1.9 | 1.9 | 1.9 | 1.9 | 1.9 |
| methylene donor (10) | — | 2 | 2 | 2 | 2 |
| sulphur | 1.1 | 1.1 | 1.1 | 1.1 | 1.1 |
| accelerator (11) | 2 | 2 | 2 | 2 | 2 |

(1) to (5): idem Table 1;
(6): novolac resins: - C-6: idem Table 1; C-7: modified alkylphenol (XR14545C from Ceca); - C-8: modified "tallol" (tall oil) (XR146212C from Ceca); C-9: formophenolic (ortho catalysis) (XR4364 from Ceca);
(7) to (11): idem Table 1.

TABLE 5

| | Composition No.: | | | | |
|---|---|---|---|---|---|
| | C-5 | C-6 | C-7 | C-8 | C-9 |
| Properties before curing: | | | | | |
| Mooney (MU) | 93 | 81 | 74 | 76 | 79 |
| T5 (min) | 18 | 12 | 10 | 13 | 11 |
| Properties after curing: | | | | | |
| M10 (MPa) | 6.3 | 12.4 | 13.7 | 12.0 | 11.6 |
| M100 (MPa) | 1.8 | 2.1 | 2.1 | 2.1 | 2.1 |
| M300 (MPa) | 2.0 | 1.8 | 1.8 | 1.85 | 1.85 |
| Shore A | 67 | 78 | 79.5 | 77 | 77 |
| ΔG* | 6.1 | 12.4 | 11.8 | 12.7 | 12.0 |
| $\tan(\delta)_{max}$ | 0.32 | 0.37 | 0.38 | 0.39 | 0.38 |
| $M10_{Ac}$ | 4.9 | 7.5 | 8.2 | 7.1 | 7.1 |
| Breaking stress (MPa) | 21 | 18 | 19 | 18 | 17 |
| Elongation at break (%) | 595 | 610 | 630 | 575 | 560 |

On reading these results, it will be noted that, compared with the control composition C-5 which is devoid of M.A.D. system, the compositions used as treads according to the invention have the following characteristics:
  in the uncured state, a lower Mooney viscosity, which is beneficial to processing; a reduction in T5 in all cases, with values (10 to 13 min) which nevertheless offer a sufficient safety margin with respect to the problem of scorching;
  after curing, reinforcement properties which are substantially equivalent, illustrated by values close to the moduli at high deformations (M100 and M300), and also the properties at break;
  significantly greater rigidity, illustrated both by a Shore A hardness increased by approximately 16% (change from 67 points to an average value of 78 points) and by a modulus M10 at low deformation which is substantially doubled (from 6.3 MPa to 12.5 MPa, on average);
  correlatively, an expected increase in the hysteresis (increase in dynamic properties ΔG* and $\tan(\delta)_{max}$);
  finally, after mechanical accommodation, values of modulus at low deformation ($M10_{Ac}$) which drop very greatly, recovering values closed to the initial value observed on the control composition C-5 which is devoid of resin lattice.

The unexpected results of Test 1 above (virtual "reversibility" of the modulus M10, after mechanical accommodation) are thus clearly confirmed, in the presence of various types of novolac resins, making it possible to predict, for tires comprising these compositions C-6 to C-9 as treads, the same improved compromise of road behaviour and grip as that observed in Test 2 above, owing to the presence of a radial rigidity gradient in the tread.

It will furthermore be noted that the compositions C-6 to C-9 according to the invention have very close properties, whatever the novolac resin used as methylene acceptor.

Test 5. Here five compositions filled with silica (C-10 to C-14) are compared, similar to those of Test 4 above.

A first control composition (C-10) is devoid of M.A.D. system, a second control composition (C-11) comprises the methylene acceptor but not the methylene donor. The other three compositions (C-12 to C-14) constitute three new variants, with different M.A.D. systems, of compositions usable as treads according to the invention; it will be noted in particular that composition C-14 comprises, as M.A.D. system, two different methylene acceptors and two different methylene donors.

Tables 6 and 7 show the formulation of the different compositions (Table 6—amounts of the different products expressed in phr), and their properties before and after curing (40 min at 150° C.).

Reading these results entirely confirms, if it were necessary, the conclusions of the above tests, namely, for the compositions C-12, C-13 and C-14 according to the invention, compared with the control C-10:
  in the uncured state, a lower Mooney viscosity, which is beneficial to processing;
  admittedly a reduction in T5, but values (15 min) which are satisfactory with respect to the problem of scorching;
  after curing, an (expected) increase in the hysteresis (ΔG* and $\tan(\delta)_{max}$);

TABLE 6

| | Composition No.: | | | | |
|---|---|---|---|---|---|
| | C-10 | C-11 | C-12 | C-13 | C-14 |
| SBR (1) | 70 | 70 | 70 | 70 | 70 |
| BR (2) | 30 | 30 | 30 | 30 | 30 |
| carbon black (3) | 6 | 6 | 6 | 6 | 6 |
| silica (4) | 80 | 80 | 80 | 80 | 80 |
| coupling agent (5) | 6.4 | 6.4 | 6.4 | 6.4 | 6.4 |
| methylene acceptor (6) | — | 5 | 5 | 5 | 1.5 |
| methylene acceptor (6bis) | — | — | — | — | 2.5 |
| oil (7) | 33 | 33 | 33 | 33 | 33 |
| DPG (8) | 1.5 | 1.5 | 1.5 | 1.5 | 1.5 |
| ZnO | 2.5 | 2.5 | 2.5 | 2.5 | 2.5 |
| stearic acid | 2 | 2 | 2 | 2 | 2 |
| antioxidant (9) | 1.4 | 1.4 | 1.4 | 1.4 | 1.4 |
| methylene donor (10) | — | — | — | 1.5 | 0.75 |
| methylene donor (12) | — | — | 1.5 | — | 1.5 |
| sulphur | 1.5 | 1.5 | 1.5 | 1.5 | 1.5 |
| accelerator (11) | 1.5 | 1.5 | 1.5 | 1.5 | 1.5 |

(1) to (6) idem Table 1;
(6 bis) diphenylolpropane ("Bisphenol A" from Bayer);
(7) to (11) idem Table 1;
(12) H3M ("Additol VXT 3923" from Vianova resins).

TABLE 7

| | Composition No.: | | | | |
|---|---|---|---|---|---|
| | C-10 | C-11 | C-12 | C-13 | C-14 |
| Properties before curing: | | | | | |
| Mooney (MU) | 90 | 91 | 84 | 85 | 78 |
| T5 (min) | 17 | 11 | 14 | 14 | 14 |

TABLE 7-continued

|  | Composition No.: | | | | |
| --- | --- | --- | --- | --- | --- |
|  | C-10 | C-11 | C-12 | C-13 | C-14 |
| Properties after curing: | | | | | |
| M10 (MPa) | 6.3 | 9 | 12 | 11.2 | 11 |
| M100 (MPa) | 1.9 | 2.0 | 2.5 | 2 | 2.2 |
| M300 (MPa) | 2.1 | 2.0 | 2.3 | 1.7 | 2.1 |
| Shore A | 68 | 72 | 78.5 | 78 | 77 |
| $\Delta G^*$ | 6.8 | 11 | 15 | 12.4 | 12.9 |
| $\tan(\delta)_{max}$ | 0.34 | 0.41 | 0.40 | 0.37 | 0.40 |
| $M10_{Ac}$ | 5.0 | 6.6 | 7.3 | 6.9 | 6.7 |
| Breaking stress (MPa) | 19 | 20 | 18 | 17 | 18 |
| Elongation at break (%) | 540 | 585 | 510 | 600 | 550 | reinforcement properties which are at least equal (values close to the moduli M100 and M300; equivalent properties at break);

distinctly increased rigidity: plus 10 points on the Shore hardness, modulus M10 virtually doubled (from 6.3 MPa to 10.8 MPa on average);

finally, after accommodation, values of modulus at low deformation ($M10_{Ac}$) which practically recover those of the control C-10.

In accordance with the results of the preceding tests, these latter two characteristics must be analysed as synonymous of improved road behaviour (due to the stiffening in depth of the tread) without adversely affecting or even improving the grip on wet ground (due to a surface rigidity which is virtually not modified, after accommodation).

It will be noted finally that the control composition C-11, comprising a methylene acceptor without curing agent, reveals intermediate properties which are of little interest.

As for the composition C-14 according to the invention, comprising two different methylene acceptors (formo-phenol+diphenylolpropane) associated with two methylene donors (HMT and H3M), it exhibits the best overall compromise of properties for this test, both before curing (viscosity and scorching time) and after curing (rigidity, reinforcement and hysteresis).

Test 6. In this test two new rubber compositions based on silica (C-15 and C-16) are compared which constitute two new variants of compositions usable as treads according to the invention. The amount of reinforcing inorganic filler has been slightly reduced compared with the preceding tests, while remaining within a preferred range of between 60 phr and 100 phr.

The composition C-16 is identical to composition C-15, except that a coupling activator system such as described in the aforementioned application WO00/05301, formed by the association of a zinc dithiophosphate (DTPZn) and a guanidine derivative (DPG) has been added to C-16; such an activator has the ability to improve the effectiveness of a polysulphurised alkoxysilane coupling agent.

Tables 8 and 9 show the formulation of the different compositions, and their properties before and after curing (40 min at 150° C.).

TABLE 8

|  | Composition No.: | |
| --- | --- | --- |
|  | C-15 | C-16 |
| SBR (1) | 70 | 70 |
| BR (2) | 30 | 30 |
| carbon black (3) | 6 | 6 |
| silica (4) | 70 | 70 |
| coupling agent (5) | 5.6 | 5.6 |
| methylene acceptor (6) | 4 | 4 |
| oil (7) | 25 | 25 |
| DTPZn (10) | — | 0.75 |
| DPG (8) | 1.3 | 1.3 |
| ZnO | 2.5 | 2.5 |
| stearic acid | 2 | 2 |
| antioxidant (9) | 1.9 | 1.9 |
| methylene donor (12) | 1 | 1 |
| sulphur | 1.5 | 1.5 |
| accelerator (11) | 1.5 | 1.5 |

(1) to (9) idem Table 1;
(10) Rhenocure TP/G manufactured by Rhein-Chemie (50% by weight of DTPZn on elastomeric support - or, here, 1.5 phr of Rhenocure TP/G);
(11)-(12) idem Table 5.

TABLE 9

|  | Composition No.: | |
| --- | --- | --- |
|  | C-15 | C-16 |
| Properties before curing: | | |
| Mooney (MU) | 88 | 88 |
| T5 (min) | 16 | 10 |
| Properties after curing: | | |
| M10 (MPa) | 9.2 | 9 |
| M100 (MPa) | 2.1 | 2.5 |
| M300 (MPa) | 2.1 | 2.9 |
| Shore A | 74 | 74.5 |
| $\Delta G^*$ | 10 | 8 |
| $\tan(\delta)_{max}$ | 0.35 | 0.32 |
| $M10_{Ac}$ | 5.7 | 5.6 |
| Breaking stress (MPa) | 19 | 17 |
| Elongation at break (%) | 585 | 485 |

On reading these results, it will be noted that the incorporation of DTPZn and DPG in composition C-16 has a beneficial effect on the major part of the properties, with in particular:

an increase in the reinforcement, as indicated by a substantial increase in the values M100 and M300, and in the ratio M300/M100;

advantageously combined with a substantial reduction in the hysteresis (reduction of $\Delta G^*$ and $\tan(\delta)_{max}$).

The two evolutions above clearly illustrate a better interaction between the reinforcing inorganic filler and the elastomer, in other words a coupling effect which is optimised due to the presence of the coupling activator system.

It will furthermore be noted that this optimised reinforcement is obtained without adversely affecting the action of the M.A.D. system (values of Shore A hardness, moduli M10 and $M10_{Ac}$ identical).

In the preceding results a slight increase in the hysteresis in the presence of the M.A.D. system had been noted, for the compositions and treads of the invention filled with silica, which is harmful with respect to the rolling resistance. The use of a coupling activator is a way of overcoming this drawback owing to the possibility which it offers, for example, of reducing the amount of reinforcing inorganic filler.

Test 7. Five rubber compositions are compared, all reinforced with silica (80 phr) and a small proportion (6 phr) of carbon black, these compositions being used as treads for tires for passenger vehicles.

The control composition (C-17) is devoid of M.A.D. system. The other 4 compositions (C-18 to C-21) comprise such a system; the methylene acceptor is used therein in amounts varying from 2 to 5 phr, the quantity of methylene donor being selected to be equal to 60% by weight relative to the quantity of acceptor.

Tables 10 and 11 give the formulation of the different compositions, some of their properties after curing (40 min at 150° C.), and the properties of the tires (respectively P-17 to P-21) comprising the corresponding treads. These tires are manufactured and tested as indicated previously for Test 2.

The treads comprising the compositions C-18 to C-21 and the tires P-18 to P-21 are therefore all in accordance with the invention.

TABLE 10

| | Composition No.: | | | | |
|---|---|---|---|---|---|
| | C-17 | C-18 | C-19 | C-20 | C-21 |
| SBR (1) | 70 | 70 | 70 | 70 | 70 |
| BR (2) | 30 | 30 | 30 | 30 | 30 |
| carbon black (3) | 6 | 6 | 6 | 6 | 6 |
| silica (4) | 80 | 80 | 80 | 80 | 80 |
| coupling agent (5) | 6.4 | 6.4 | 6.4 | 6.4 | 6.4 |
| methylene acceptor (6) | — | 5 | 4 | 3 | 2 |
| oil (7) | 33 | 33 | 33 | 33 | 33 |
| DPG (8) | 1.5 | 1.5 | 1.5 | 1.5 | 1.5 |
| ZnO | 2.5 | 2.5 | 2.5 | 2.5 | 2.5 |
| stearic acid | 2 | 2 | 2 | 2 | 2 |
| antioxidant (9) | 1.4 | 1.4 | 1.4 | 1.4 | 1.4 |
| methylene donor (10) | — | 3 | 2.4 | 1.8 | 1.2 |
| sulphur | 1.1 | 1.1 | 1.1 | 1.1 | 1.1 |
| accelerator (11) | 2.0 | 2.0 | 2.0 | 2.0 | 2.0 |

(1) to (11) idem Table 1.

TABLE 11

| | Composition No. | | | | |
|---|---|---|---|---|---|
| | C-17 | C-18 | C-19 | C-20 | C-21 |
| M10 (MPa) | 5.6 | 11.3 | 9.9 | 8.6 | 7.8 |
| Shore A | 70 | 82 | 79 | 77 | 74 |
| | tire No.: | | | | |
| | P-17 | P-18 | P-19 | P-20 | P-21 |
| Drift thrust (r.u.) | 100 | 122 | 116 | 111 | 109 |
| Performance on a damp circuit comprising bends (r.u.): | | | | | |
| travelling time: | 100 | 98.5 | 99.2 | 98.4 | 99.5 |
| behaviour mark: | 100 | 115 | 115 | 115 | 105 |

On reading the results of Table 11, it will be noted first of all that, compared with the control composition C-17, the compositions C-18 to C-21 have, all the more so the larger the quantity of M.A.D. system, a greater rigidity illustrated by a Shore A hardness and a modulus M10 both of which are significantly increased, the modulus M10 being substantially doubled (from 5.6 MPa to 11.3 MPa) for the highest amount of M.A.D. system.

This greater rigidity results, for the tires according to the invention, not only in an (expected) increase in the drift thrust (an indicator of the behaviour on dry ground), but also and in particular, unexpectedly, in an improvement in the behaviour on wet ground (see performance on a damp circuit comprising bends).

There are thus confirmed, in the presence of the M.A.D. system combined with the high amount of reinforcing inorganic filler, the improved overall compromise of road behaviour and grip as observed in Test 2 above, obtained due to the presence of a radial rigidity gradient in the treads according to the invention.

Test 8. In this Test 2 new compositions are compared which are reinforced with a high amount of silica, used to constitute all or of a tread for passenger-vehicle tires.

The composition according to the invention (C-23) comprises the M.A.D. system, whereas the control composition (C-22) is devoid thereof. The formulation of the 2 compositions is close to those of Table 6 (Test 5), except that, in particular, the diene elastomer used here is a mixture of two SBRs of different microstructures.

Tables 12 and 13 give this detailed formulation of the 2 compositions, some of their properties after curing (40 min at 150° C.), and the properties of the corresponding tires (respectively P-22 and P-23), manufactured and tested as indicated for Test 2 above, except for the following details:

the tread of the control tires P-22 is formed exclusively by the control composition C-22;

the tread of the tires P-23 according to the invention is a composite tread having a "cap/base" structure such as described above, formed by the two radially superposed compositions C-22 and C-23, the composition according to the invention C-23 constituting the base, that is to say the radially inner part (on a new tire) of the tread.

On reading the results of Table 13, it will be noted first of all that the presence of the M.A.D. system in the composition C-23 involves a very substantial increase in Shore A hardness (nearly 20% greater). This greater rigidity results, for the tires P-23 according to the invention, in significantly improved on-vehicle behaviour, not only on dry ground (increase in the drift thrust) but also and in particular on wet ground: travelling time distinctly reduced (less than 4 seconds approximately per lap of the circuit) and a significantly improved behaviour mark (+15%).

Thus, the beneficial effect of the invention, obtained due to the phenomenon of auto-accommodation, is once again demonstrated, even in the case in which the composition based on the M.A.D. system constitutes only part of the tread, in this case in this test the radially inner part of the tread which is intended to come into contact with the road only later, after its (radially) outer part of this tread has become worn.

TABLE 12

| | Composition No. | |
|---|---|---|
| | C-22 | C-23 |
| SBR (1) | 55 | 55 |
| SBR (2) | 45 | 45 |
| carbon black (3) | 6 | 6 |
| silica (4) | 82 | 82 |
| coupling agent (5) | 6.6 | 6.6 |
| methylene acceptor (6) | — | 1.5 |
| methylene acceptor (6bis) | — | 2.5 |
| oil (7) | 41.5 | 41.5 |
| DPG (8) | 1.5 | 1.5 |
| ZnO | 2.5 | 2.5 |
| stearic acid | 2 | 2 |
| antioxidant (9) | 1.9 | 1.9 |
| methylene donor (10) | — | 0.75 |
| methylene donor (12) | — | 1.5 |
| sulphur | 1.4 | 1.4 |
| accelerator (11) | 1.5 | 1.5 |

(1) SBR (expressed in dry SBR) extended with 37.5% (20.6 phr) of oil (or a total of 75.6 phr of extended SBR); 27% stirene, 27% 1-2-polybutadiene units and 78% trans-1-4-polybutadiene units (Tg = −50° C.);
(2) SBR (expressed in dry SBR) extended with 37.5% (16.9 phr) of oil (or a total of 61.9 phr of extended SBR); 40% stirene, 25% 1-2-polybutadiene units and 48% trans-1-4-polybutadiene units (Tg = −30° C.);
(3) to (12) idem Table 6.

TABLE 13

|  | Composition No. | |
|---|---|---|
|  | C-22 | C-23 |
| Shore A (evolution in r.u.) | 72 (100) | 82 (119) |

|  | tire No.: | |
|---|---|---|
|  | P-22 | P-23 |
| Drift thrust (r.u.): | 100 | 125 |
| Performance on a damp circuit comprising bends (r.u.): | | |
| travelling time: | 100 | 96 |
| behaviour mark: | 100 | 115 |

Test 9. In this last test, 2 new compositions reinforced with silica are compared, which are similar to those of Test 1 (compositions C-3 and C-4) except that, in particular, in this case an HD silica of smaller specific surface area is used. The composition according to the invention (C-25) comprises the M.A.D. system, whereas the control composition (C-24) is devoid thereof; these 2 compositions are used as treads for passenger-car tires.

Tables 14 and 15 give the formulation of the compositions, some of their properties before and after curing (40 min at 150° C.), and the properties of the corresponding tires (respectively P-24 and P-25) (manufactured and tested as indicated for Test 2 above).

TABLE 14

|  | Composition No. | |
|---|---|---|
|  | C-24 | C-25 |
| SBR (1) | 70 | 70 |
| BR (2) | 30 | 30 |
| carbon black (3) | 6 | 6 |
| silica (4) | 80 | 80 |
| coupling agent (5) | 4.8 | 4.8 |
| methylene acceptor (6) | — | 5 |
| oil (7) | 33 | 33 |
| DPG (8) | 1.1 | 1.1 |
| ZnO | 2.5 | 2.5 |
| stearic acid | 2 | 2 |
| antioxidant (9) | 1.9 | 1.9 |
| methylene donor (10) | — | 3 |
| sulphur | 1.1 | 1.1 |
| accelerator (11) | 2 | 2 |

(4) silica "Zeosil 1115 MP" from Rhodia, type "HD" (BET and CTAB: approximately 110 m²/g);
(1) to (3) and (5) to (11): idem Table 1.

TABLE 15

|  | Composition No. | |
|---|---|---|
|  | C-24 | C-25 |
| Mooney (MU) | 71 | 64 |
| M10 (MPa) | 5.5 | 10.9 |
| M100 (MPa) | 1.8 | 1.9 |

TABLE 15-continued

|  | tire No.: | |
|---|---|---|
|  | P-22 | P-23 |
| Drift thrust (r.u.): | 100 | 115 |
| Performance on a damp circuit comprising bends (r.u.): | | |
| travelling time: | 100 | 97 |
| behaviour mark: | 100 | 110 |

The results of Table 15 confirm once again the beneficial unexpected effects of the invention (composition C-25 and tires P-25), due to the combined presence of the M.A.D. system and the high amount of reinforcing inorganic filler, with:

a significant reduction in viscosity in the uncured state;

a very substantial increase in the rigidity in the cured state (Shore A hardness and modulus M10), without adversely affecting the level of reinforcement (illustrated by the modulus M100);

finally, once again, significantly improved behaviour of the tires according to the invention, both on dry ground (drift thrust increased by 15%) and on wet ground, due to the auto-accommodation resulting from the combined presence of the M.A.D. system and a high amount of reinforcing inorganic filler.

In conclusion, due to the treads according to the invention and to the specific formulation of their rubber compositions, it is henceforth possible to "reconcile" what had hitherto appeared irreconcilable, namely grip on one hand and road behaviour on the other hand, without using solutions which are complex, costly or non-durable such as described in the introduction to the present specification.

The treads according to the invention described in the preceding examples offer the major advantage, compared with the "composite" treads of the prior art, on one hand of maintaining their compromise of performances throughout the life of the tire, due to the unexpected phenomenon of auto-accommodation, and on the other hand of having a true radial rigidity gradient, and not a simple, very localised, "accident" of rigidity. This true rigidity gradient results in optimum "working" of the blocks of rubber in contact with the ground, during running and the numerous forces transmitted to the tread, in other words is synonymous with a tire which grips the road even better.

The invention will find a very advantageous application in tires fitted on vehicles such as motorcycles, passenger cars, vans or heavy vehicles, in particular in high-grip tires of the "snow" or "ice" type (also referred to as "winter" tires) which, owing to a deliberately more flexible tread, could hitherto have qualities of road behaviour, on dry ground, which were sometimes judged to be insufficient.

The novel compromise of properties thus obtained, which has clearly shifted compared with the acquired knowledge of the prior art, may furthermore be obtained while keeping the performances of rolling resistance and of wear resistance at the high levels which one is entitled to expect nowadays of rubber compositions based on reinforcing inorganic fillers such as highly dispersible silicas, capable of replacing the conventional tire-grade carbon blacks.

What is claimed is:

1. A tire, the tire comprising a tread, the tread comprising:
a rubber composition, the rubber composition based on:
a diene elastomer;
more than 50 phr of silica as an inorganic reinforcing filler;

between 2 and 15 phr of an inorganic filler/diene elastomer coupling agent;
between 1 and 10 phr of a methylene acceptor,
between 0.5 and 5 phr of a methylene donor; and
optionally carbon black, present in an amount less than 20% by weight relative to the quantity of total reinforcing filler, the quantity of total reinforcing filler being the sum of the silica and the carbon black, wherein the tread presents a radially increasing rigidity gradient from the surface towards the inside of the tread after mechanical run-in of the tread.

2. The tire of claim 1, wherein the diene elastomer is selected from the group consisting of polybutadienes, synthetic polyisoprenes, natural rubber, butadiene copolymers, isoprene copolymers and mixtures thereof.

3. The tire of claim 1, wherein the diene elastomer is a butadiene-styrene copolymer (SBR).

4. The tire of claim 1, wherein the quantity of the inorganic filler is between 60 and 100 phr.

5. The tire of claim 1, wherein the inorganic filler-diene elastomer coupling agent is an organosilane or a polyorganosiloxane.

6. The tire of claim 1, wherein the quantity of methylene acceptor is between 2 and 8 phr.

7. The tire of claim 1, wherein the quantity of methylene donor is between 0.5 and 3.5 phr.

8. The tire of claim 1, wherein the methylene acceptor is at least one phenolic resin.

9. The tire of claim 8, wherein the methylene acceptor is a novolac phenolic resin.

10. The tire of claim 1, wherein the methylene donor is selected from the group consisting of hexamethylenetetramine (HMT), hexamethoxymethylmelamine (H3M), hexaethoxymethyl-melamine, polymers of para-formaldehyde, N-methylol derivatives of melamine, and mixtures thereof.

11. The tire of claim 10, wherein the methylene donor is selected from the group consisting of HMT, H3M, and mixtures thereof.

12. The tire of claim 1, wherein the quantity of methylene acceptor represents between 2% and 15% by weight relative to the weight of reinforcing inorganic filler.

13. The tire of claim 1, wherein the quantity of methylene donor represents between 10% and 80% by weight relative to the weight of methylene acceptor.

14. The tire of claim 1, wherein the reinforcing inorganic filler represents more than 80% of the total reinforcing filler.

15. The tire of claim 1, wherein the reinforcing inorganic filler is used in a mixture with carbon black.

16. The tire of claim 1, wherein the carbon black is present in an amount of less than 10% by weight relative to the quantity of total reinforcing filler.

17. The tire of claim 1, wherein the tread comprises a structure of the "cap/base" type formed of two different, radially superposed, rubber compositions, and wherein the rubber composition which comprises the methylene acceptor and the methylene donor forms the radially inner part of this tread.

18. The tire of claim 1, wherein the tread comprises a structure of the "cap/base" type formed of two different, radially superposed, rubber compositions, and wherein the rubber composition which comprises the methylene acceptor and the methylene donor forms the radially outer part of this tread.

19. The tire of claim 1, wherein the tire is a passenger tire for a passenger car.

20. The tire of claim 1, wherein the tire is a "winter" tire intended for snow-covered or icy roads.

* * * * *